United States Patent [19]

Hofmeister

[11] 4,389,722
[45] Jun. 21, 1983

[54] METHOD FOR THE SIMULTANEOUS TRANSMISSION OF A PLURALITY OF DATA STREAM OVER ONE TRANSMISSION CHANNEL

[75] Inventor: Hagen Hofmeister, Korb, Fed. Rep. of Germany

[73] Assignee: Licentia Patent-Verwaltungs-GmbH, Frankfurt am Main, Fed. Rep. of Germany

[21] Appl. No.: 186,631

[22] Filed: Sep. 12, 1980

[30] Foreign Application Priority Data

Sep. 13, 1979 [DE] Fed. Rep. of Germany ....... 2937073

[51] Int. Cl.³ ................................................ H04J 3/06
[52] U.S. Cl. ..................................... 370/100; 375/111
[58] Field of Search ...................... 370/100, 110.4, 11; 375/111, 114

[56] References Cited

U.S. PATENT DOCUMENTS

| | | | |
|---|---|---|---|
| 3,404,231 | 10/1968 | Aaron et al. | 370/100 |
| 3,804,985 | 4/1974 | Matsuo | 370/100 |
| 4,121,056 | 10/1978 | Stout | 370/100 |

OTHER PUBLICATIONS

CCITT Recommendations V26, V27 and V29, vol. VIII .1, pp. 101–112, 118–139 and 143–153.
"Microcoded Modem Transmitters" by Choquet et al., IBM J. Res. Develop., Jul. 1974.
"Data Transmissions with 4.8 Kbit . . . " from Telefunken Scientific, 1978, pp. 231–245.

*Primary Examiner*—Douglas W. Olms
*Attorney, Agent, or Firm*—Spencer & Kaye

[57] ABSTRACT

A method for simultaneously transmitting a plurality of data streams over one transmission channel with the aid of modems, wherein in order to synchronize the receiver for the purpose of device-specific modulation, a small additional modulation is applied in the transmitter, with the frequency of the additional modulation being equal to the transmitter modulation rate divided by a whole number, and the additional modulation is demodulated in the receiver by multiplying the associated values obtained from the scanning clock pulse by the difference between the associated and actual values received, and the resulting parameter is freed of interference with the aid of a band pass filter or a phase control loop.

16 Claims, 9 Drawing Figures

ELEMENTARY SIGNALS

METHOD FOR THE SIMULTANEOUS TRANSMISSION OF A PLURALITY OF DATA STREAM OVER ONE TRANSMISSION CHANNEL

BACKGROUND OF THE INVENTION

The present invention relates to a method of simultaneously transmitting a plurality of digital data streams over one channel. More particularly, the present invention relates to a method of providing the synchronizing signal for a data channel in which a plurality of digital data streams are being transmitted by means of modems which does not require the transmission of additional digital synchronizing information.

If a plurality of data streams are to be transmitted simultaneously over one channel, this can be done by means of digital multiplexers. However, in every case this requires additional digital information which reduces the effective transmission rate. If the transmission is effected with modems in which modulation takes place in groups of bits (e.g. as disclosed in CCITT Recommendations V26, V27 and V29, Vol. VIII.1, pages 101–112, 118–139 and 143–153, respectively), the bit groups can be split into individual channels. No special additional information is then required. For example, in a modem according to CCITT Recommendation V29, four bits are combined into a bit group (quadbit) and the first bit can then be assigned to channel 1, the second bit to channel 2 etc. The result is that there are again four channels with standard bit rates. However, the desire is to transmit data streams at rates which cannot be combined into bit groups.

This problem arises, for example, if two channels such carrying 2400 bit/s are to be transmitted via a modem with 4800 bit/s according to CCITT Recommendations V27 bis/ter. According to that proposal, 3 bits are combined into tribits and are modulated into eight different phase shifts with 1600 baud.

SUMMARY OF THE INVENTION

It is the object of the present invention to provide a method which permits the transmission of a plurality of digital data streams over one channel without requiring additional digital synchronizing information.

This is accomplished according to the present invention in that in a method for simultaneously transmitting a plurality of modulated digital data streams over one transmission channel with the aid of a pair of modems with one of the modems acting as a transmitter and the other of the modems acting as a receiver, and wherein the data streams are modulated at the modem acting as the transmitter, transmitted via the single channel and demodulated at the modem acting as a receiver; the receiver is synchronized with the device specific modulation of the transmitter by: applying a small additional modulation to the transmitted signal in the transmitter with the frequency of the additional modulation being equal to the modulation rate of the transmitter signal divided by a whole number; demodulating the additional modulation in the receiver by deriving, from actual values of the received modulated signal, associated values corresponding to the received values to be expected in a system without the additional modulation, and multiplying the derived values by the difference between the associated derived and actual received values; freeing the resulting parameter signal of interferences; and using the interference freed parameter signal as the synchronizing signal in the receiver. The parameter signal is freed of interferences by passing same through a band pass filter or by applying same to a phase control loop.

Preferably the additional modulation frequency is selected to be one-half of the modulation frequency of the modem. Moreover, if the modem uses differential phase shift keying or frequency modulation, the additional modulation is preferably an amplitude modulation. Finally, the additional modulation is preferably sinusoidal and its minima identify a particular data channel.

In the example of the modem according to CCITT Recommendation V27 bis, according to the invention, the phase modulation would have superposed on it a small amplitude modulation whose minimum identifies the first information channel or data stream. Each information channel is provided alternatingly with a bit group (tribit) for transmission. At the receiver the knowledge of the transmitted signal states is utilized to recover the additional information or modulation. The generation of the additional small modulation can be effected at the transmitting end by means of any known modulation circuit.

The additional amplitude modulation preferably lies in the order of magnitude of 1% to 10% of the maximum amplitude of the transmitted signal. In particular, the additional modulation, i.e., the amplitude modulation, should be small enough so that the transmission is not interfered with and yet be large enough so that the synchronizing information is recognized at the receiving end. At the receiving end, the additional information is advantageously obtained from the demodulated received signal ($x_e$; $y_e$) and the demodulated received signal after passage through a decision circuit ($x_i$, $y_i$). This can be done by deriving the synchronizing signal $T_M$ from the following relationship $$T_M = \text{sign } H(t) \ [(x_e - x_i)x_i + (y_e - y_i)Y_i]$$

where H(t) is a filter function indicating a band pass behavior in the frequency range.

DETAILED DESCRIPTION OF THE PREFERRED EMBODIMENT

Figure 1:
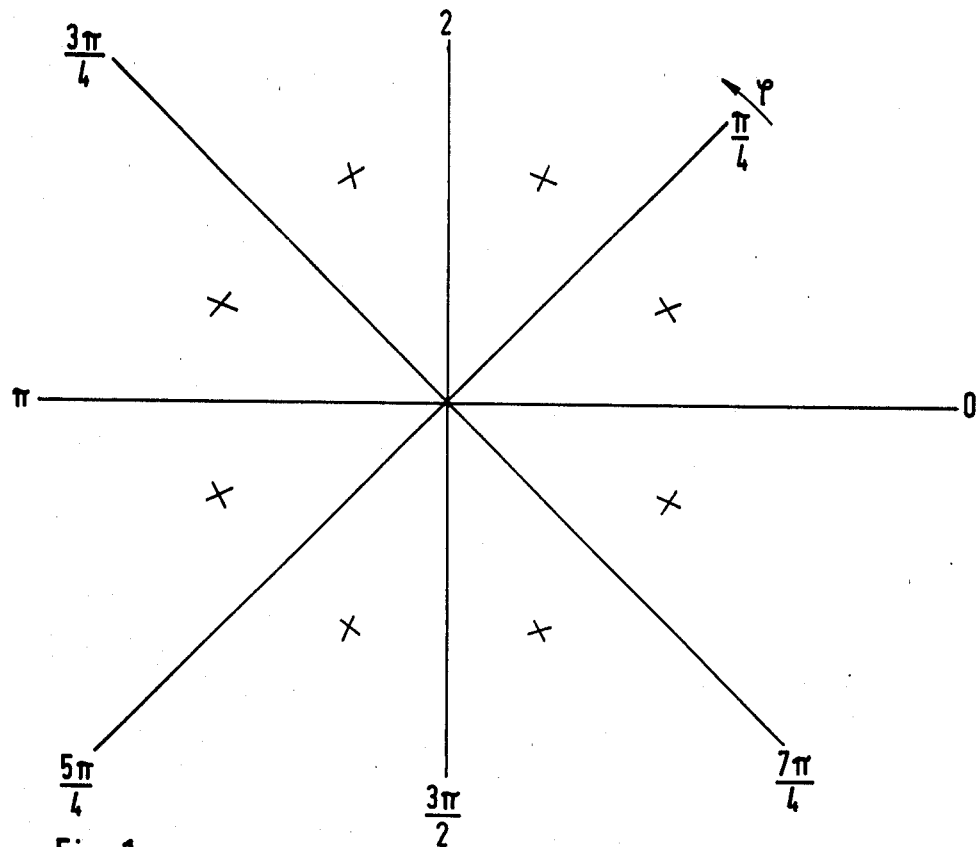
FIG. 1 shows the cartesian coordinates of a transmitted signal according to CCITT Recommendation V27 bis, (2.3.2), i.e., an 8-DPSK (Differential Phase Shift Keying) system.
Figure 2:
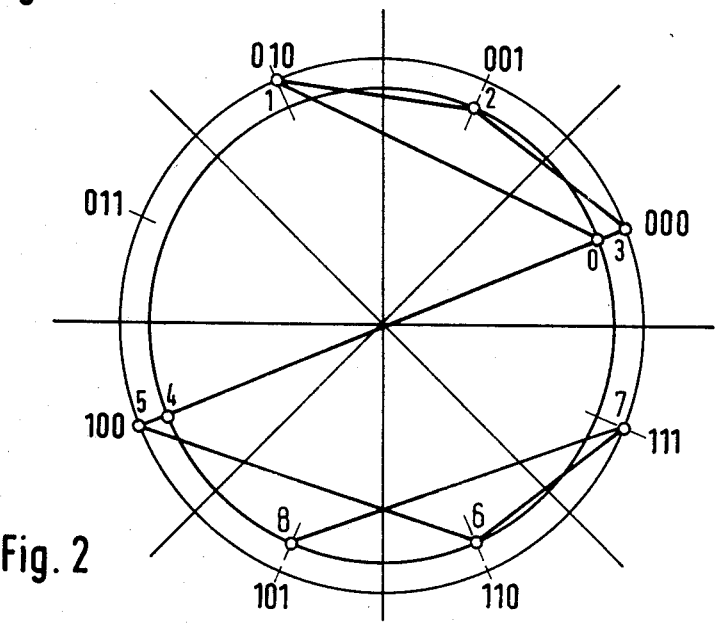
FIG. 2 shows a possible curve for a transmitted signal with superposed modulation according to the invention.

Turning now to the figures, the present invention will now be explained with the aid of the example of a 4800 bit/s modem with phase difference or phase shift keying modulation. According to CCITT Recommendation V27 bis, which describes such a system, three of the bits furnished by the data device are combined, after they have passed through a scrambler into bit groups (tribits) and are transmitted at a modulation rate of 1600 baud as an eight-phase difference modulation, i.e., 8-DPSK. The eight possible transmitting vectors are shown in FIG. 1 in the phase plane. If now according to the invention, a small additional amplitude modulation is applied which alternates in the rhythm of half the transmission or modulation rate, the resulting curve for the transmitting vectors is shown in the example of FIG. 2. Beginning with point 0, the bit groups 010, 101, 101, 111, 001, 010, 000, 100 are transmitted passing through points 1 through 8. As the amplitude here always alternates from low to high.

If two channals of respective 2400 bits/sec are transmitted in common via a Modem according to V27$_{bis}$ so these two digital data streams are, according to the invention, interlocked and supplied to the transmitter in respective 3-bit groups.

At the beginning of the transmission only the vector of the transmitter signal is in a random position of one of the allowed points. In the case of FIG. 2, the starting point "0" is arbitrary chosen at 22.5° and small amplitude.

With the small amplitude being marked, that means that in this case for example a bitgroup of the second channel is transmitted.

If the received bitseries of the two channels after the scrampler have the following structure

| channel 1 | 010 | 101 | 001 | 000 |
|---|---|---|---|---|
| channel 2 | 101 | 111 | 010 | 100 | then the transmitted bitseries are

| 010 | 101 | 101 | 111 | 001 | 010 | 000 | 100 |
|---|---|---|---|---|---|---|---|
| g | s | g | s | g | s | s | s | g = great, means channel 1
s = small, means channel 2

The bitseries of the channels may be single scrambled or favorably may be summarized and then commonly scrambled. This scanning may be favorably controlled by the tribitclock of the transmitter.

The transmitted bitseries are worked up in the transmitter in respective groups of three (tribits) and gives, according V27$_{bis}$, the following transmitter vectors 0-8:

| Starting vector | Tribit | Δ φ | φ | amplitude |
|---|---|---|---|---|
| 0 | | | 22;5° | s |
| 1 | 010 | 90° | 112;5° | g |
| 2 | 101 | 315° | 67;5° | s |
| 3 | 101 | 315° | 22;5° | g |
| 4 | 111 | 180° | 202;5° | s |
| 5 | 001 | 0° | 202;5° | g |
| 6 | 010 | 90° | 292;5° | s |
| 7 | 000 | 45° | 337;5° | g |

| Starting vector | Tribit | Δ φ | φ | amplitude |
|---|---|---|---|---|
| 8 | 100 | 270° | 247;5° | s |

Naturally the position of these 8 phase vectors are arbitrary under the assumption that the phase jumps of $$\Delta\phi = n\cdot 45° \quad (n=0, 1, 2, 3, 4, 5, 6, 7)$$

are kept.

A transmitter for a 4800 bit/s modem in digital realization is described in an article by Heinz Göckler, Hagen Hofmeister and Reinhard Till, "Datenübertragung mit 4.8 kbit/s im Fernsprechnetz: Entwurf und Realisierung eines Modems nach CCITT-Empfehlung V27 bis/ter," Telefunken Wissenschaftliche Berichte, ["Data Transmission with 4.8 kbit/s in a Telephone Network: Design and Realization of a Modem According to CCITT Recommendation V27 bis/ter," TELEFUNKEN Scientific Reports] 1978, No. 4, pages 231-245, and in particular in Section 2 on pages 233-237. This described transmitter, which has been modified or expanded by the addition of a multiplexing device according to the present invention, is shown in FIG. 3.

Figure 3:
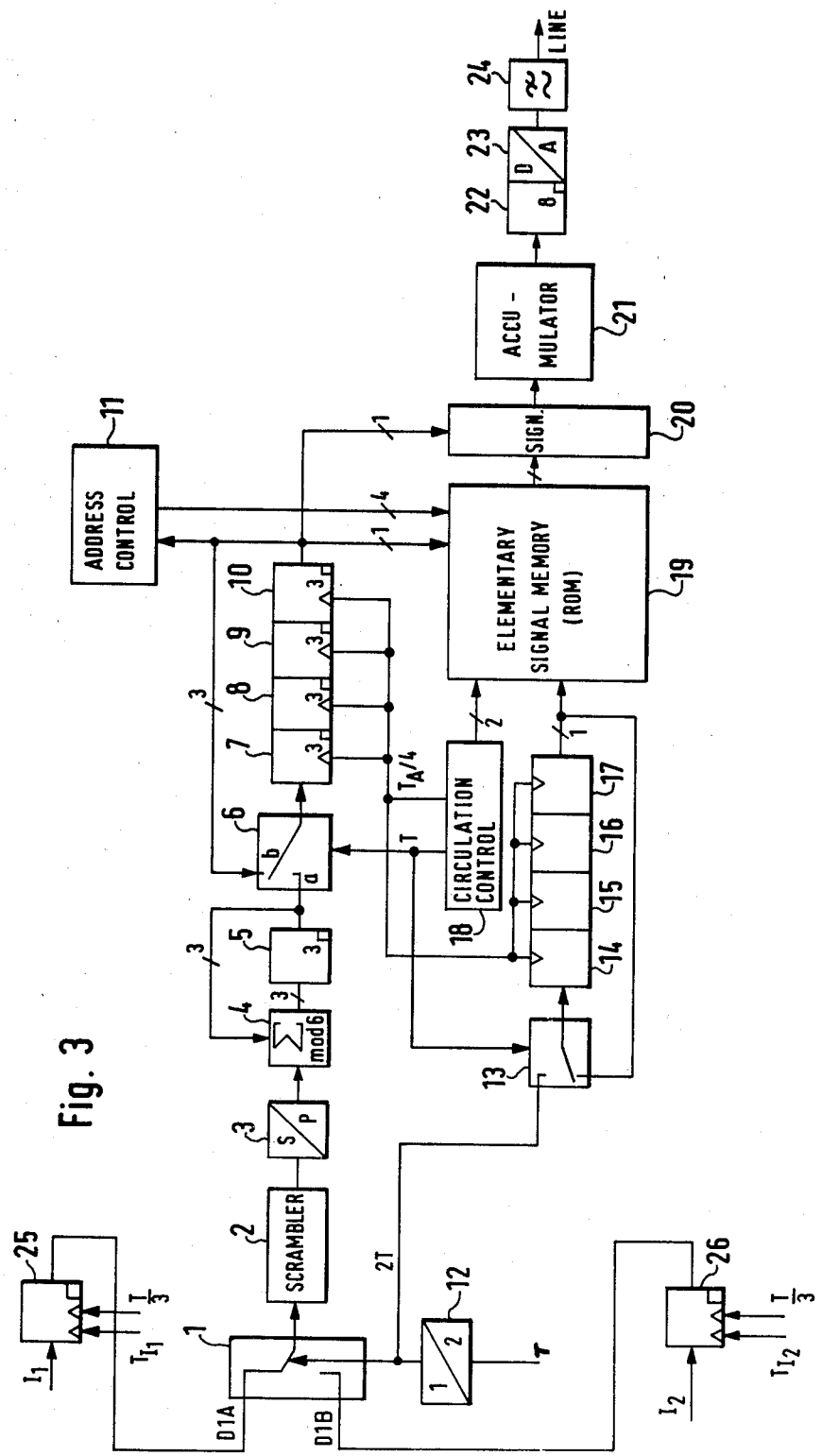
FIG. 3 shows the design of one embodiment of a transmitter for use in carrying out the method according to the invention.

As shown in FIG. 3, the two data streams with 2400 bit/s each which are to be transmitted via the single transmission channel are furnished via lines D1A and D1B. In multiplexer 1, three bits from line D1A and three bits from line D1B are successively switched into the scrambler 2. The multiplexer 1 is controlled at a frequency equal to the modulation frequency of the transmitter, i.e., the tribit clock pulse rate T, divided by a whole number. In the present embodiment the multiplexer 1 is controlled by the output of a 2:1 divider 12 to whose input is supplied the tribit clock pulse T. Consequently, the multiplexer 1 is controlled by one-half of the tribit clock pulse T. When the bit groups have passed through the scrambler 2 and the series/parallel converter 3, difference coding is effected in coding circuits 4 and 5. Depending on the information involved, the previously calculated elementary signals or transmitting pulse sequences stored in read-only-memory (ROM) 19 are read out and, with the proper sign as supplied by unit 20, added in accumulator 21. After digital to analog conversation in converter 23 and filtering in filter 24, the transmitted signal is put into the line. Two sets of transmitting signals are available in the read only memory 19: one set for the higher amplitude values and one set for the lower amplitude values. Switching is effected by the multiplexer by means of the highest address bit.

The data which are supplied by the inputs $I_1$ and $I_2$ are stored in the respective elastic stores 25 respectively and 26 with the clock pulses $T_{I1}$ and $T_{I2}$ respectively of 2400 Hz.

These elastic stores must have a storage capacity of at least two bits. It is, however, favorable to make the storage capacity greater in order to compensate jitter. The data to be transmitted are read out by the clock T/3 (3 $f_T$=4800 Hz) every time the multiplex switch 1 is in the corresponding position.

The multiplex switch 1 is controlled by the clock 2T ($\frac{1}{2}f_T$=800 Hz) which is derived from the tribit clock T ($f_T$=1600 Hz) by the divider 12. Every time the clock pulse 2T is positive, the multiplex switch 1 is in position D1A; correspondingly, if the clock pulse 2T is negative, the multiplex switch 1 is in position D1B.

Figure 5:
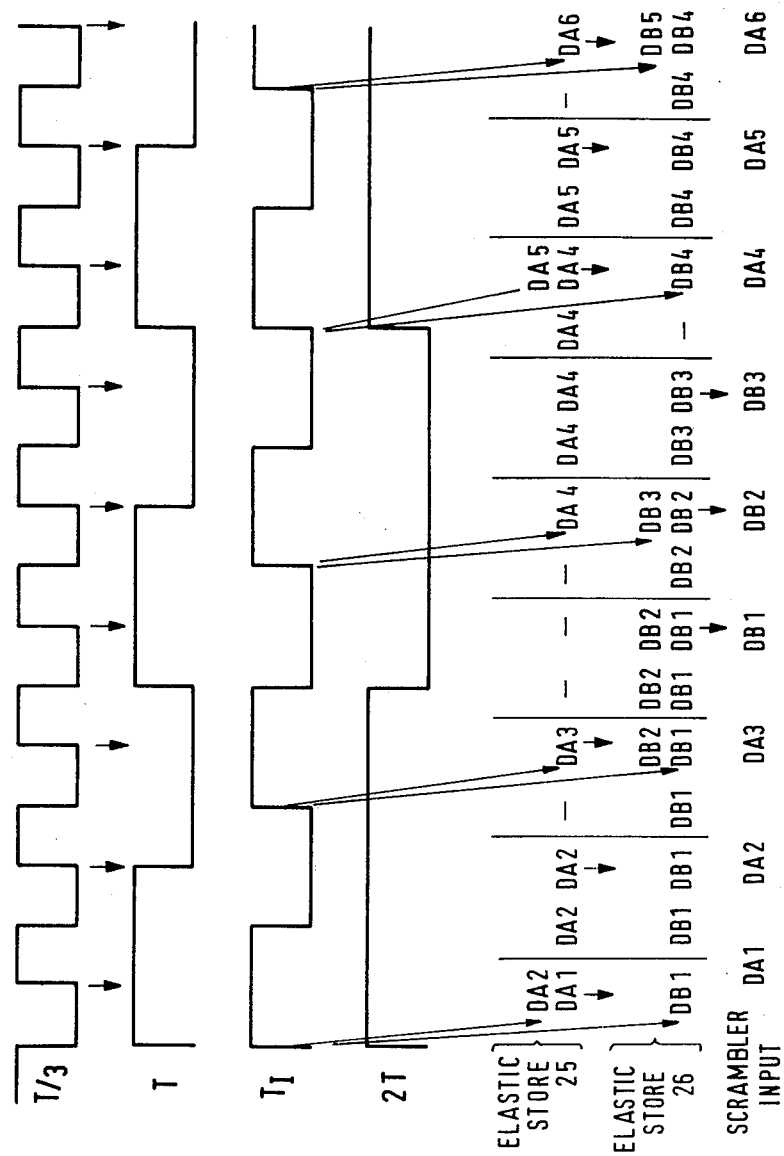
FIG. 5 shows the relationship of the clocks and data of the multiplexer switch 1 and the elastic stores 25 and 26 of FIG. 3.

This process is shown in FIG. 5. FIG. 5 shows the resulting data series at the input of scrambler 2 as well as the states within the elastic stores 25 and 26. In FIG. 5, the abbreviation DA1 means: databit 1, channel A etc.

The scrambler 2 works as described in CCITT V27$_{bis/ter}$.

The subsequent series/parallel converter 3 puts respective three databits together in to a parallel three bit-word. These three bits are supplied from the scrambler 2 during the clock interval T. From the parallel three bit-word, is a phase difference according to CCITT V27$_{bis/ter}$ is encoded.

In the store 5, the last transmitted vector is stored as a binary number 0–7 (see also FIG. 2). This value is, in adder 4, added to the encoded phase difference as the number of the 45° jump and then newly computed transmitter vector is again stored in store 5.

Figure 6:
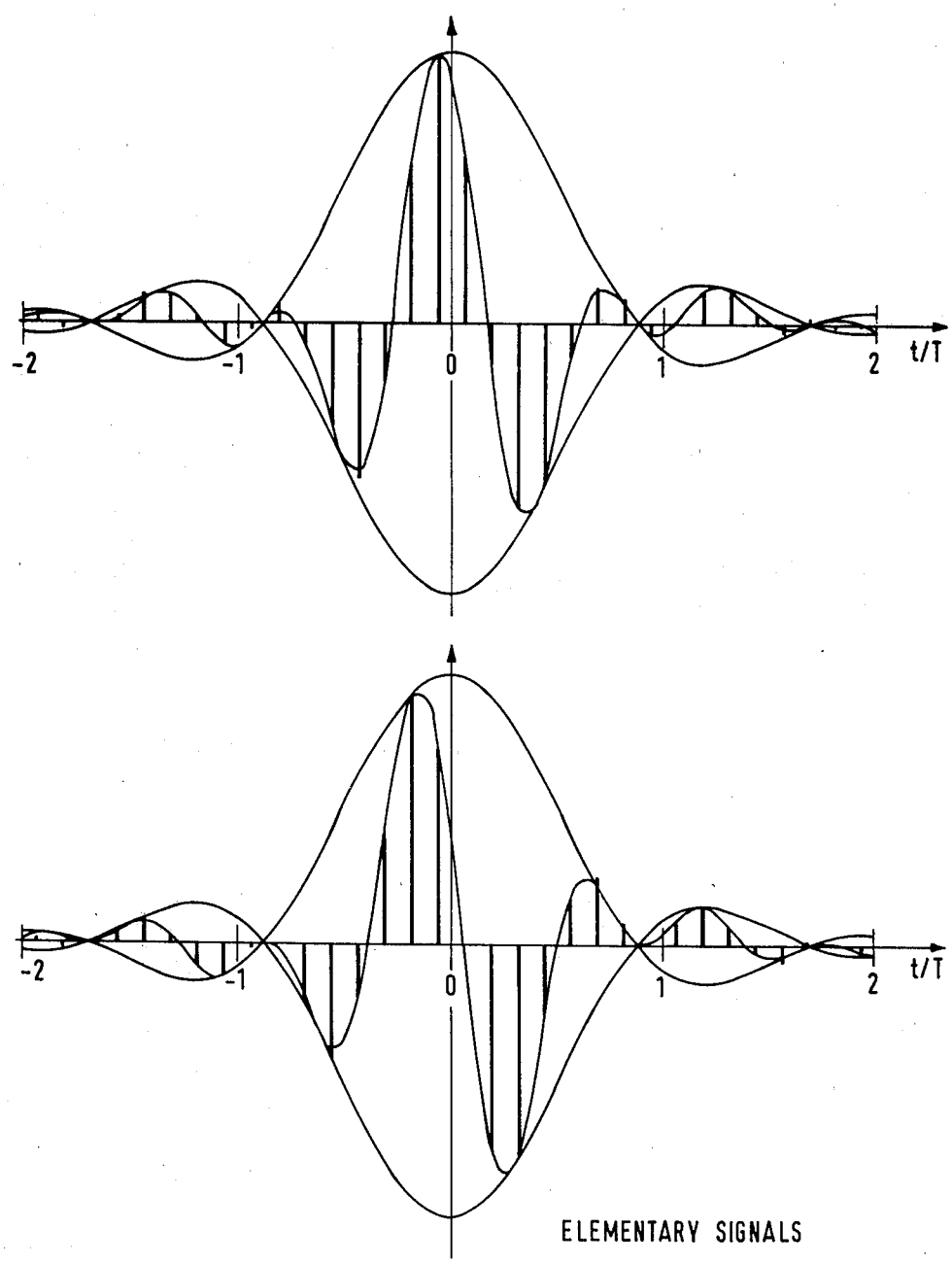
FIG. 6 shows two examples of elementary signals as stored in memory 19 of FIG. 3.

In the read-only memory (ROM) 19, modulated signal-vectors (elementary signals) as scanning values are already stored. This is illustrated in FIG. 6 by means of two examples. There are eight signal-vectors required. Because four signal-vectors are derivable by sign inversion, only four signal-vectors need be stored. These are, for example, the transmitter vectors 22.5°, 67.5°, 112.5° and 157.5°.

In FIG. 6 the transmitter vectors 112.5° and 157.5° are shown, with respect to the envelope, the modulated transmitter vector and the scanning values for a scanning rate of 12.8 kHz.

Each of these elementary signals extends itself over several (for example four) clock pulses, so they have to be superposed (compare: Microcoded Modem transmitter, M. F. Choquet, H. J. Nussbaumer, IBM Journal Res. Develop., July 1974, page 338–351).

This superposing is carried out in the stores 7–10 in that the respective actual vector as well as the precursor respective follow up pulse to be superposed are stored. These vector values are read in at the beginning of the clock T (switch 6 in position a). In order to add the actual values, the switch 6 is put in position b and the four vectors to be superposed are supplied as succesive addresses to the ROM 19.

The ROM address control 11 sets which of the actual scanning values of the signal elements are to read out, while the circulation control 18 controls the circulation of the four stored vector values in the stores 7–10.

The scanning values of the four actual vectors which are read out of the ROM 19 are, with the needed sign, evaluated in circuit 20 to provide the four absent vector elements and then they are added in accumulator 21.

After passing through the store 22 and the digital-/analog converter 23, and after the removal of the harmonics in the filter 24, the signal is supplied to the line.

The known transmitter is extended by the elements 13–17 and by doubling the storage capacity of the signal memory (ROM) 19. The circulation control 18 now additionally controls a switch 13 whose position during write-in to store 14 represents the position of switch 1. Consequently, for each respective vector value in stores 7–10, the associated position of switch 1 is noted in store 14–17.

The circulation of the stored content in stores 7–10 is synchronized in the circulation of the stored contents of stores 14–17. In the signal memory 19 two complete sets of signal elements are now stored; one set with the greater or larger amplitude of the envelope and one set with smaller amplitude of the envelope.

The output of the store 17 controls the selected bit of the ROM 19 which selects the respective greater or smaller values, the remainning address of these values is determined by the circulation control 18 and the ROM address control 11.

Figure 7:
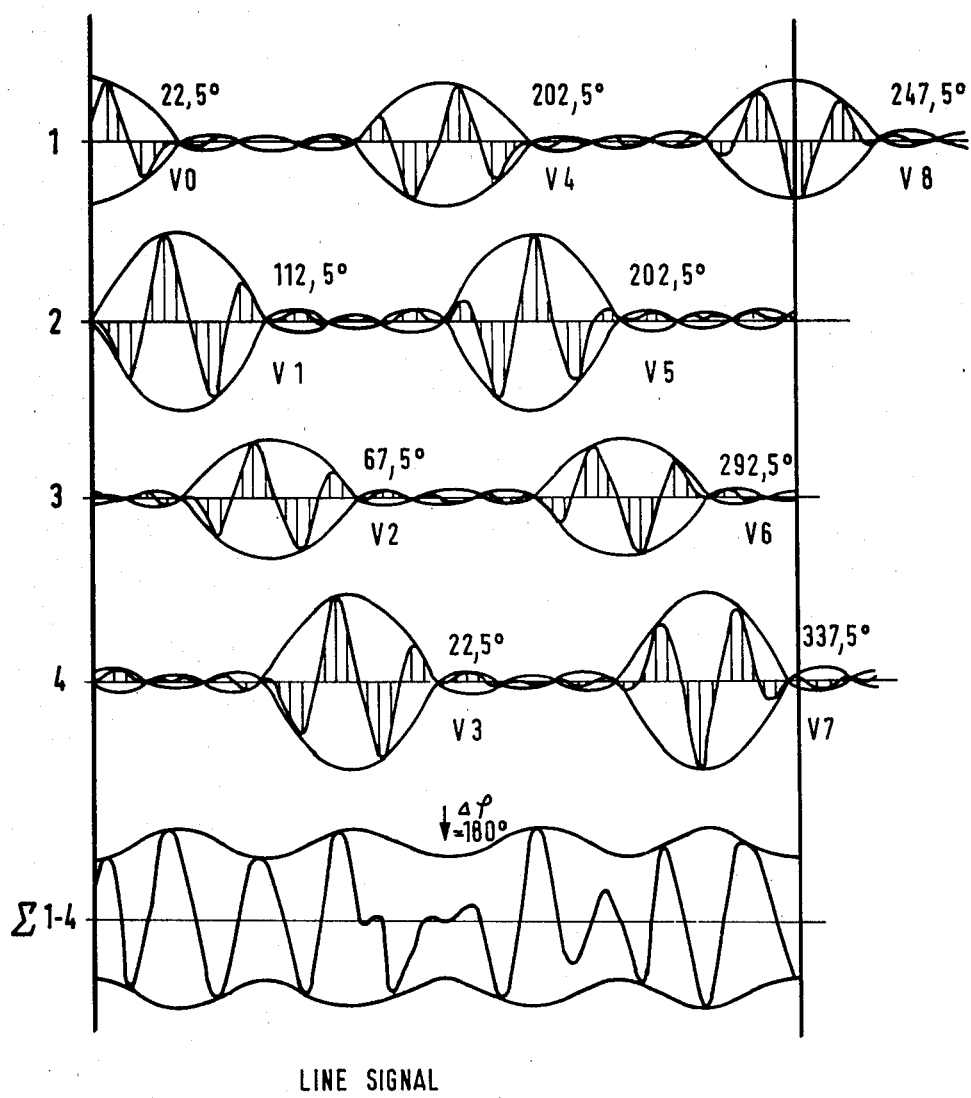
FIG. 7 shows the superposition of signal elements to get the line signal with the added small amplitude modulation.

FIG. 7 shows the summerizing of the transmitter signal.

Figure 4:
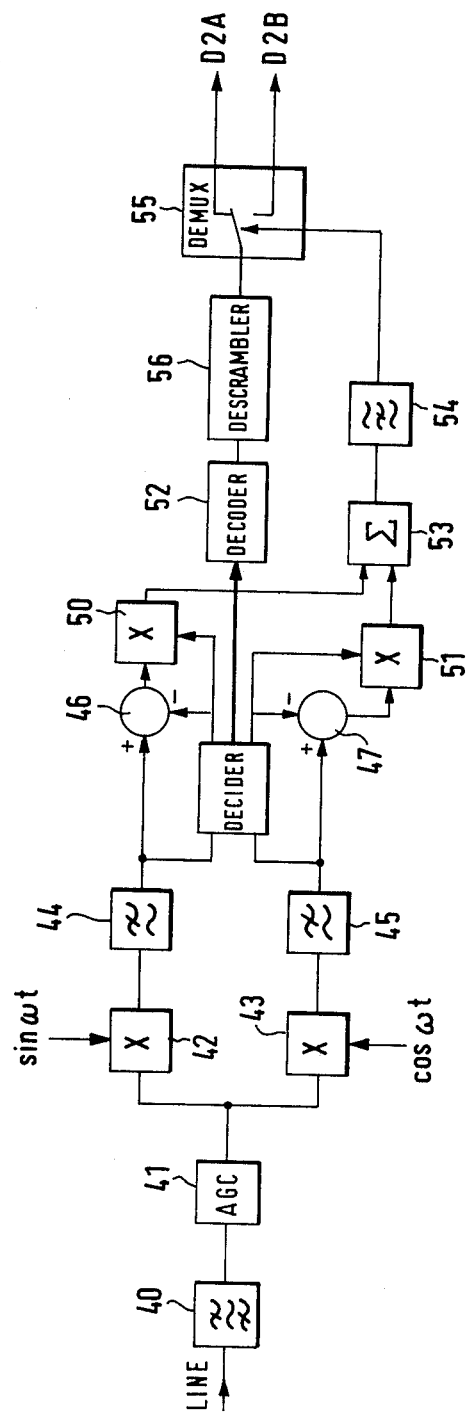
FIG. 4 shows the design of an embodiment of a receiver for use in carrying out the method according to the invention.

Turning now to the receiver as shown in FIG. 4, the analog signal received from the transmission channel or line is, in a conventional manner, fed via a band pass filter 40 and an AGC circuit 41 to a conventional amplitude demodulator circuit. In particular the output signal from AGC circuit 41 is passed to a pair of multipliers 42 and 43 wherein they are multiplied by the signals sin wt and cos wt respectively. The output signals from multiplier 42 and 43, after filtering in respective low pass filters 44 and 45, are fed to one input of respective difference circuits 46 and 47 and to decision circuit 48. The respective outputs of the circuit 48, which constitute the actual associated values of the received signals, are fed to the other input of the respective difference circuits 46 and 47, to an input of a respective multiplier 50 and 51, and to a decoder 52. The outputs of the difference circuits 46 and 47, which constitute the error in each of the data channels, are fed to the other inputs of the respective multipliers 50 and 51, whose respective product signals are summed in a summing circuit 53. The output of summing circuit 53, after filtering in a band pass filter 54, is the desired synchronizing signal $T_M$ which is used to control the de-multiplexer 55 so as to properly demultiplex the output signal from decoder 52, after descrambling in circuit 56, into the two data streams D2A and D2B.

Figure 8:
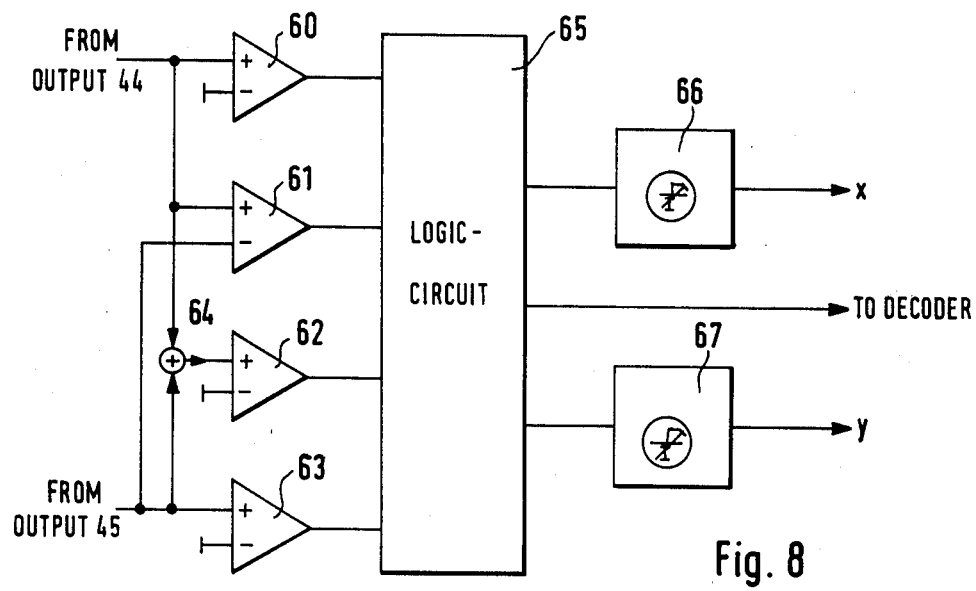
FIG. 8 shows a circuit which could be used as the decider 48 in FIG. 4.

An example of an decision circuit 48 is shown in FIG. 8. The signals (x, y) from filters 44 and 45 are examined with the aid of the comparators 60–63 to determine in which octant the respective received vector lies. The comparator 60 decides on the straight line equation $x=0$, comparator 61 on the straight line equation $x-y=0$ comparator 62 on the straight line equation $x+y=0$ and comparator 63 on the straight line equation $y=0$. These straight line equations are shown in FIG. 9.

Figure 9:
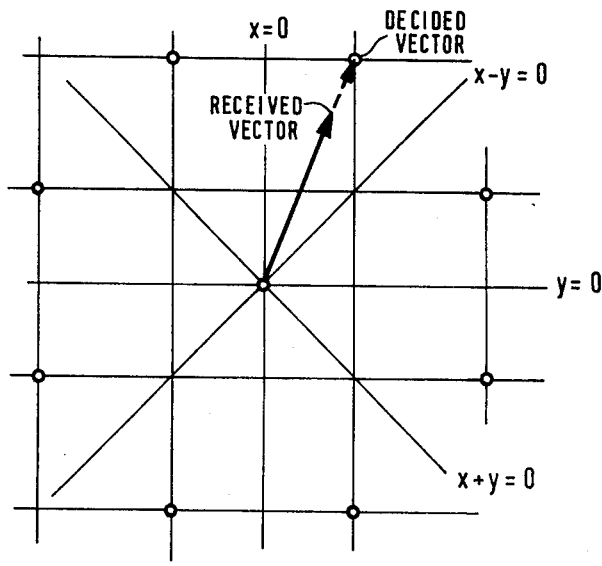
FIG. 9 shows a received vector and a decided vector as is done by the decider of FIG. 8.

The output signals of the comparators 60–63 are converted in the logic circuit 65 so that the controlled power sources 66 and 67 supply voltages corresponding to the respective eight possible accessory decision vectors shown in FIG. 9.

In FIG. 9 a received vector and the accessory associated decision vector are shown. The decoder 52 decodes the decided vectors into binary digits as described in CCITT V27$_{bis/ter}$. A descrambler 56 is shown in CCITT V27$_{bis/ter}$, Appendix 1.

It is to be understood that the above description of the present invention is susceptible to various modifications, changes and adaptations, and the same are intended to be comprehended within the meaning and range of equivalents of the appended claims.

What is claimed is:

1. In a method for simultaneously transmitting a plurality of modulated digital data streams over one transmission channel with the aid of a pair of modems, one of the modems acting as a transmitter and the other of the modems acting as a receiver, and wherein the data streams are modulated at the modem acting as the transmitter, transmitted via the single channel and demodulated at the modem acting as a receiver; the improvement comprising synchronizing the receiver with the specific modulation of the individual data streams of the transmitter by: applying a small additional modulation to the transmitter signal with the frequency of the additional modulation being equal to the modulation rate of the transmitter signal divided by a whole number; demodulating the additional modulation in the receiver by deriving, from actual values of the received modulated signal, associated values corresponding to the received values to be expected in a system without the additional modulation, and multiplying the derived values by the difference between the associated derived and actual received values; freeing the resulting parameter signal of interferences; and using the interference freed parameter signal as the synchronizing signal in the receiver.

2. A method as defined in claim 1 wherein said step of freeing the resulting parameter of interferences comprises passing said resulting parameter signal through a band pass filter.

3. A method as defined in claim 1 wherein in a modem with differential phase shift keying modulation, said additional modulation is an amplitude modulation.

4. A method as defined in claim 3 wherein said additional modulation is sinusoidal.

5. A method as defined in claim 4 wherein the minima of said additional modulation identify a particular transmission channel.

6. A method as defined in claim 1 wherein said additional modulation frequency is equal to one-half of said modulation rate.

7. A method as defined in claim 1 wherein an entire modulation bit group is used for the transmission of each individual channel.

8. In a method for simultaneously transmitting a plurality of modulated digital data streams over one transmission channel with the aid of a pair of modems, one of the modems acting as a transmitter and the other of the modems acting as a receiver, and wherein the modulated data streams are multiplexed at the modem acting as the transmitter, transmitted via the single channel and demodulated and demultiplexed at the modem acting as a receiver; the improvement comprising synchronizing the receiver with the multiplexed signal of the transmitter by: applying a small additional modulation to the modulated data streams of the transmitter signal with the frequency of the additional modulation being equal to the modulation rate of the multiplexed transmitter signal divided by a whole number; demodulating the additional modulation in the receiver by deriving, from actual values of the received modulated signal, associated values corresponding to the received values to be expected in a system without the additional modulation, and multiplying the derived values by the difference between the associated derived and actual received values; freeing the resulting parameter signal of interferences; and using the interference freed parameter signal as the synchronizing signal for the multiplexed signal in the receiver.

9. A method as defined in claim 8 wherein said step of freeing the resulting parameter of interferences comprises passing said resulting parameter signal through a band bass filter.

10. A method as defined in claim 8 wherein in a modem with differential phase shift keying modulation, said additional modulation is an amplitude modulation.

11. A method as defined in claim 10 wherein said additional modulation is sinusoidal.

12. A method as defined in claim 11 wherein the minima of said additional modulation identify a particular transmission channel.

13. A method as defined in claim 8 wherein said additional modulation frequency is equal to one-half of said modulation rate.

14. A method as defined in claim 8 wherein as entire modulation bit group is used for the transmission of each individual channel.

15. A method as defined in claim 8 wherein said plurality of modulated data streams are time multiplexed.

16. A method as defined in claim 15 wherein two modulated data streams are being simultaneously transmitted.

* * * * *